United States Patent [19]

Ueno

[11] Patent Number: 4,547,177
[45] Date of Patent: Oct. 15, 1985

[54] KINEMATIC UNIVERSAL COUPLING

[76] Inventor: Yauso Ueno, 17-3-209, Higashi Nogawa 3-chome, Komae-shi, Tokyo, Japan

[21] Appl. No.: 488,768

[22] Filed: Apr. 26, 1983

[30] Foreign Application Priority Data

May 2, 1982 [JP] Japan .................. 57-73929

[51] Int. Cl.$^4$ ............................ F16D 3/04; F16D 3/30
[52] U.S. Cl. ........................................ 464/69; 464/137; 464/904
[58] Field of Search .................. 464/69, 106, 120, 121, 464/137, 138, 147, 904, 905

[56] References Cited

U.S. PATENT DOCUMENTS 2,481,640  9/1949  Amberg ..................... 464/905 X
4,314,460  2/1982  Mayfield ..................... 464/69
4,439,168  3/1984  Orain ..................... 464/137 X

FOREIGN PATENT DOCUMENTS 0140916  8/1982  Japan ..................... 464/69

Primary Examiner—Stuart S. Levy
Assistant Examiner—Daniel P. Stodola
Attorney, Agent, or Firm—Shapiro and Shapiro

[57] ABSTRACT

A kinematic universal coupling assembly for converting rotation about a first rotational axis to rotation about a second rotational axis comprises a driving member rotatable about the first rotational axis and having first, second and third torque transmitting portions relative to the first rotational axis, a driven member rotatable about the second rotational axis and having first, second and third torque transmitted portions relative to the second rotational axis, lines connecting the first, second and third torque transmitted portions to the first, second and third torque transmitting portions intersecting one another at a point, and a torque transmitting device for transmitting a torque from a rotative driving member to a rotative driven member. The torque transmitting device includes first, second and third members for transmitting a torque from the first, second and third torque transmitting portions to the first, second and third torque transmitted portions. The first, second and third members are slidable in a direction perpendicular to the torque transmission direction in the torque transmitting portions and torque transmitted portions corresponding thereto and rotatable relative to one another about the aforementioned point.

4 Claims, 9 Drawing Figures

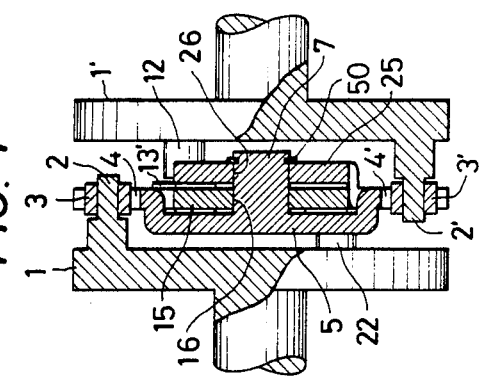
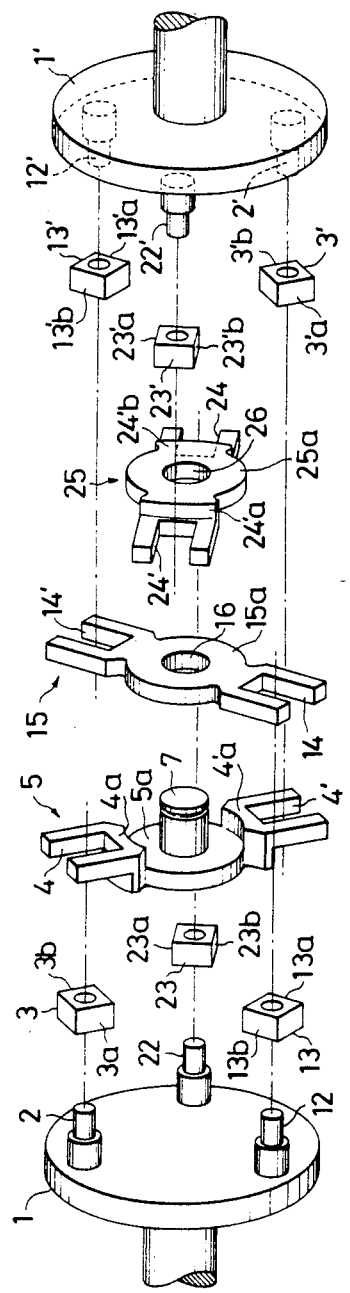

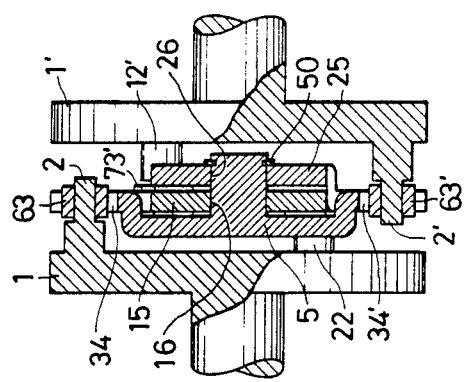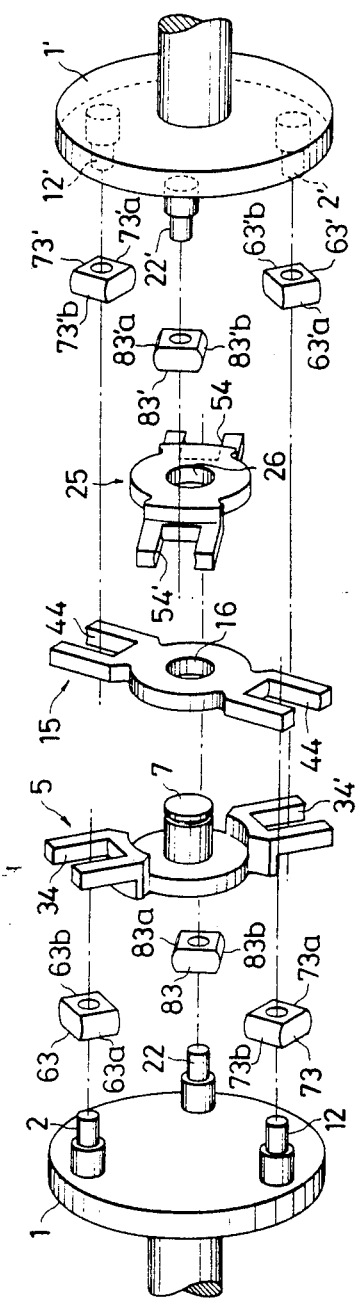

KINEMATIC UNIVERSAL COUPLING

BACKGROUND OF THE INVENTION

1. Field of the Invention

This invention relates to a kinematic universal coupling, and more particularly to a coupling for rotary shafts which is capable of transmitting a torque even when the centers of the shafts on the driving side and the driven side are not coincident with each other.

2. Description of the Prior Art

Among the couplings used for the above-described usage, there is what is called Oldham's coupling. In such coupling, straight grooves passing the center are provided in opposed coupling members, and pieces having on the front and back sides thereof straight projections perpendicular to each other are so combined that the grooves are perpendicular to each other. In the coupling of this type, however, when it rotates with two eccentric shafts coupled together, the center of gravity of the abovementioned pieces rotates on the circumference of a circle whose diameter is the center distance between the two shafts and therefore, when the rotational speed is high, large vibration occurs and the coupling cannot be used. On the other hand, when the amount of eccentricity between the two shafts is very small, use is sometimes made of a flexible shaft coupling using rubber or a spring, but the stress created in the coupling portion is high and the transmission efficiency is low and sometimes, such coupling lacks uniform speed transmission.

SUMMARY OF THE INVENTION

It is an object of the present invention to provide a kinematic universal coupling which eliminates the disadvantages peculiar to the Oldham's coupling or elastic coupling according to the prior art.

It is another object of the present invention to provide a constant velocity coupling which is free of vibration even in two shafts having a relatively large distance of eccentricity therebetween and that the same rotational phase between the two shafts, as well as excellent transmission efficiency.

It is a further object of the present invention to provide a coupling for rotary shafts in which:

(1) during rotation, the vibration of the center of gravity of the coupling is eliminated to prevent vibration during high-speed rotation;

(2) the mutual motions of the coupling parts are smoothed to enhance the transmission efficiency;

(3) a complete constant velocity characteristic is obtained; and (4) a simple and rational construction is adopted to thereby make the manufacture inexpensive and easy.

The invention will become fully apparent from the following detailed description thereof taken in conjunction with the accompanying drawings.

BRIEF DESCRIPTION OF THE DRAWINGS

FIG. 1 is a side cross-sectional view showing the construction of a first embodiment of the present invention.

FIG. 2 is an exploded perspective view thereof.

FIG. 6 is a side cross-sectional view showing the construction of a fourth embodiment of the present invention.

FIG. 7 is an exploded perspective view of the fourth embodiment.

DESCRIPTION OF THE PREFERRED EMBODIMENTS

Figure 3:
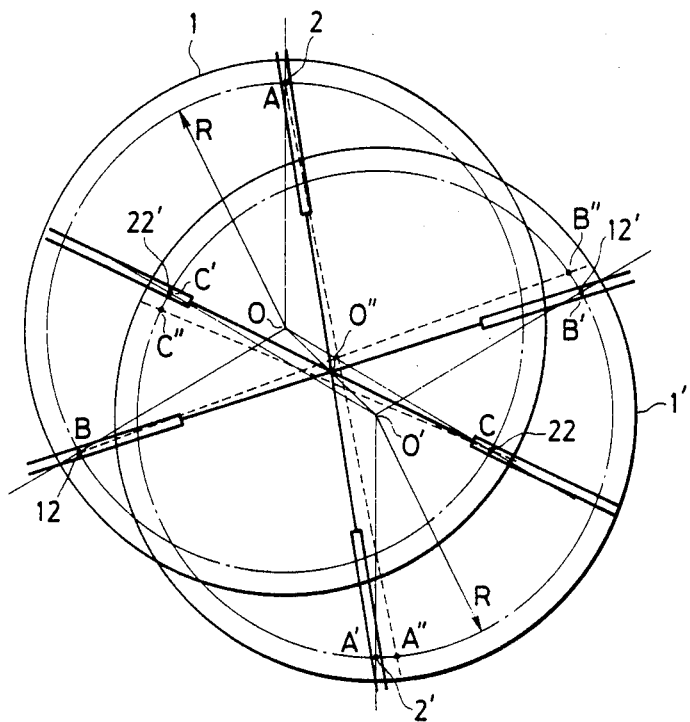
FIG. 3 is a schematic front view illustrating the motion of the present invention.

Some embodiments of the present invention will hereinafter be described in detail with reference to the drawings.

FIG. 1 is a side cross-sectional view showing the construction of a first embodiment of the present invention, and FIG. 2 is an exploded perspective view thereof. In FIGS. 1 and 2, three pins 2, 12,22 and 2', 12', 22' are axially studded at intervals of 120° on disc-like coupling members 1 and 1', respectively, rotatable about first and second axes, respectively, and pieces 3, 13, 23 and 3', 13', 23' are rotatably fitted on the pins 2, 12, 22 and 2', 12', 22', respectively. The pieces 3, 13, 23 and 3', 13', 23' have parallel side surfaces $3a$, $3b$; $13a$, $13b$; $23a$, $23b$ and $3'a$, $3'b$; $13'a$, $13'b$; $23'a$, $23'b$, respectively.

Torque transmitting means comprising three levers 5, 15 and 25 is fitted between the coupling members 1 and 1' to transmit a torque from the coupling member 1 to the coupling member 1' or from the coupling member 1' to the coupling member 1. The left lever 5 has a central disc portion $5a$, which has at the central portion thereof a shaft portion 7 integral therewith and projecting rightwardly. The lever 5 has fork portions 4 and 4' projecting in diametrically opposite directions from the central disc portion thereof and symmetrical about the center thereof. The inner side surfaces of the fork portions 4 and 4' are flat surfaces parallel to each other and adapted to slidably fit to the parallel side surfaces $3a$, $3b$ and $3'a$, $3'b$ of the pieces 3 and 3'. The fork portions 4 and 4' may extend flush with the central disc portion $5a$ and in diametrically outward directions, but preferably, as shown, they form axial extensions $4a$ and $4'a$ so as to be flush with the intermediate lever 15 and extend diametrically outwardly therefrom.

The intermediate lever 15 has formed at the center of the central disc portion $15a$ thereof an aperture 16 rotatably fitted on the central shaft 7 of the left lever 5, and has two fork portions 14 and 14' extending diametrically thereof and symmetrical about the center of the aperture 16. The fork portions 14 and 14' have parallel, flat inner side surfaces fitted to the side surfaces $13a$, $13b$ of the piece 13 and the side surfaces $13'a$, $13'b$ of the piece 13', respectively, and the piece 13 of the coupling member 1 and the piece 13' of the coupling member 1' are slidably disposed between these flat inner side surfaces.

The right lever 25 has a central aperture 26 in the central disc portion $25a$ thereof and, like the intermediate lever, it is rotatably fitted on the central shaft 7 of the left lever 5. The right lever 25 has two fork portions 24 and 24' extending diametrically from the outer peripheral portion of the central disc portion $25a$ thereof and symmetrical about the center of the central aperture 26. The right lever 25 is preferably provided with extensions 24'a and 24'b extending from the outer periphery of the central disc portion 25a thereof toward the intermediate lever 15, and the fork portions 24 and 24' thereof may preferably be flush with the intermediate lever 15. The fork portions 24 and 24' have parallel inner side surfaces fitted to the parallel, flat side surfaces 23a, 23b and 23'a, 23'b, respectively, of the pieces 23 and 23', and the piece 23 of the coupling member 1 and the piece 23' of the coupling member 1' are slidably disposed between these inner side surfaces.

In this manner, the left lever 5, the intermediate lever 15 and the right lever 25 together constitute torque transmitting means rotatable relative to each other about the shaft 7 of the left lever 5 and are incorporated between the coupling members 1 and 1', as shown in FIG. 1. As shown in FIG. 1, these levers 5, 15 and 25 are preferably prevented from being axially disengaged from one another as by a snap ring 50.

Thus, the left lever 5 is connected to the pin 2 of the coupling member 1 and the pin 2' of the coupling member 1' through the pieces 3 and 3', the intermediate lever 15 is connected to the pin 12 of the coupling member 1 and the pin 12' of the coupling member 1' through the pieces 13 and 13', and the right lever 25 is connected to the pin 22 of the coupling member 1 and the pin 22' of the coupling member 1' through the pieces 23 and 23'. With such a construction, when the centers of rotation of the coupling members 1 and 1' are O and O', respectively, and the centers of the pins 2, 12 and 22 of the coupling member 1 are A, B and C, respectively, and the centers of the pins 2', 12' and 22' of the coupling member 1' are A', B' and C', respectively, then the relation between these is formulated as shown in FIG. 3. Here, the line AA' passing through the center A of the pin 2 and the center A' of the pin 2', the line BB' passing through the center B of the pin 12 and the center B' of the pin 12', and the line CC' passing through the center C of the pin 22 and the center C' of the pin 22' intersect one another at the center O" of the shaft 7 of the lever 5, and the levers 5, 15 and 25 are slidable relative to their corresponding pins 2, 2'; 12, 12'; and 22, 22' due to the abovedescribed construction and therefore, a kind of link mechanism is formed among the coupling member 1, the torque transmitting means 5, 15, 25 and the coupling member 1' and accordingly, even if the centers O and O' of the coupling members 1 and 1' are eccentric as shown in FIG. 3, rotation is transmitted from the coupling member 1 to the coupling member 1' or from the coupling member 1' to the coupling member 1.

In FIG. 3, if the ratio of relative rotational angle between the coupling members 1 and 1' does not change, the segment OA passing through the center O of the coupling member 1 and the center A of the pin 2 and the segment O'A' passing through the center O' of the coupling member 1' and the center A' of the pin 2' are always parallel to each other and the angle OO"A and the angle O'O"A' are equal to each other and therefore, the triangles OO"A and O'O"A' are congruent to each other. Likewise, the triangles OO"B and O'O"B' and the triangles OO"C and O'O"C' are also congruent to each other. Accordingly, the ratio of rotational angle between the coupling members 1 and 1' is always equivalent. If the rotational angle changes at all, the points A', B' and C' will be A", B" and C", respectively. However, as is apparent in FIG. 3, in this case, the three levers 5, 15 and 25 cannot be coupled together at point O". That is, the levers 5, 15 and 25 coupled together with the point O" as the center as described previously cannot assume such a condition and thus, it is proved that the coupling of the present invention is a constant velocity coupling.

Further embodiments of the present invention will hereinafter be described. In the ensuing description, differences from the first embodiment will chiefly be explained and description of the same parts as those of the first embodiment will be suitably omitted.

Figure 4:
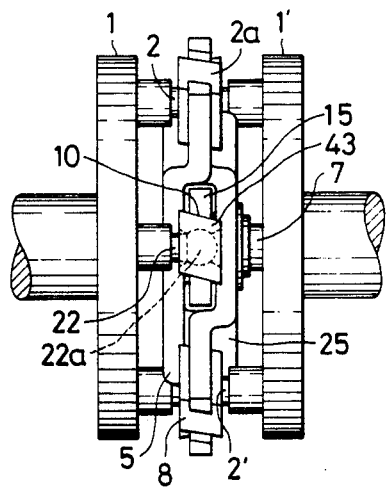
FIG. 4 is a side view showing the construction of a second embodiment of the present invention.

FIG. 4 is a side view showing the construction of a second embodiment of the present invention. In FIG. 4, pins 2, 12 and 22 (of which the pin 12 is not shown) have spherical guide portions 2a, 12a and 22a formed at the tip ends thereof, and pieces 43 are loosely fitted on the spherical guide portions 2a, 12a and 22a for swinging movement by a predetermined angle. The side surfaces 10 of parallel grooves in fork portions provided on levers 5, 15 and 25 are inclined in the same direction by a predetermined angle with respect to the center of the shaft portion 7 of the left lever 5. Accordingly, the pieces 43 fitted on the spherical guide portions 2a, 12a and 22a are also inclined by a predetermined angle correspondingly to the side surfaces 10 of the grooves in the fork portions. In such a construction, even if the coupling members 1 and 1' are not parallel to each other, a rotational force can be transmitted from the coupling member 1 to the coupling member 1' or from the coupling member 1' to the coupling member 1 due to the action of the spherical guide portions 2a, 12a and 22a of the pins 2, 12 and 22. The inclination of the side surfaces 10 of the grooves in the fork portions serves to always keep the angle of the levers 5, 15 and 25 at one half of the angle α formed between the rotary shafts of the coupling members 1 and 1' (see FIG. 8).

Figure 5:
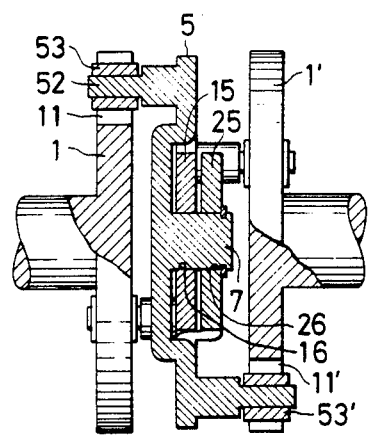
FIG. 5 is a side cross-sectional view showing the construction of a third embodiment of the present invention.

FIG. 5 is a side cross-sectional view showing the construction of a third embodiment of the present invention.

In FIG. 5, coupling members 1 and 1' are provided with grooves 11 and 11' corresponding to the fork grooves in the first and second embodiments, levers 5, 15 and 25 are provided with pins 52, and pieces 53 are loosely and slidably fitted in the grooves 11 and 11'.

Such a construction can also lead to an effect substantially equivalent to that of the FIG. 1 embodiment.

A fourth embodiment of the present invention will now be described with reference to FIGS. 6 and 7.

FIG. 6 is a side cross-sectional view showing the construction of the fourth embodiment of the present invention, and FIG. 7 is an exploded perspective view thereof. In FIGS. 6 and 7, as in the first embodiment, disc-like coupling members 1 and 1' respectively have each three pins 2, 12, 22 and 2', 12', 22' studded thereon at intervals of 120°, and pieces 63, 73, 83 and 63', 73', 83' are rotatably fitted on the pins 2, 12, 22 and 2', 12', 22', respectively. In this embodiment, each piece is contoured so that a pair of opposite side surfaces thereof are circular outer surfaces 63a, 63b; 73a, 73b; 83a, 83b; 63'a, 63'b; 73'a, 73'b; 83'a, 83'b which are part of cylindrical surfaces. On the other hand, torque transmitting means connected to the coupling members 1 and 1' through these pieces are of a construction substantially similar to the first embodiment, but the inner side surfaces of the fork grooves in the fork portions 34, 34'; 44, 44'; 54, 54' of the levers 5, 15 and 25 constituting said means are of a cylindrical shape complementary to the cylindrical surfaces of the pieces. Accordingly, the pieces fitted in the fork grooves of the levers 5, 15 and 25 are slidable toward the center O" of the torque transmitting means and also pivotable relative to the center axis of said means.

Again in the fourth embodiment, as in the first embodiment, a rotational force can be transmitted between the eccentric center lines of rotation.

Figure 8:
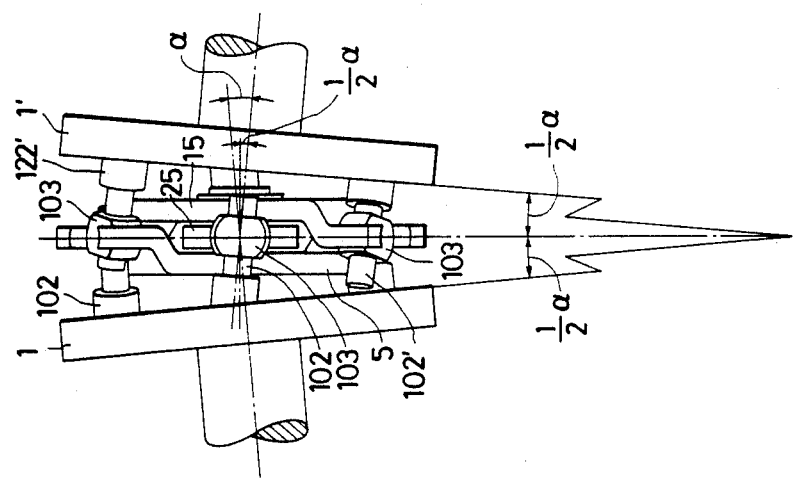
FIG. 8 is a side view showing the construction of a fifth embodiment of the present invention.

FIG. 8 is a side view showing the construction of a fifth embodiment of the present invention. In the present embodiment, pins 102, 112, 122 and 102', 112', 122' are studded circumferentially on coupling members 1 and 1' and inclined at a predetermined angle in the same direction. Partially barrel-shaped pieces 103 are loosely fitted on the pins 102, 112, 122 and 102', 112', 122'. With such a construction, a rotational force can be transmitted even if the coupling members 1 and 1' are not parallel to each other. The inclination of the pins 102, 112, 122 and 102', 112', 122' serves to always keep the angle of the levers 5, 15, 25 of the torque transmitting means at one half of the angle α formed between the rotary shafts of the coupling members 1 and 1'. In this case, the axial component of force of the rotational force created by the inclination of the pins 102, 112, 122 and 102', 112', 122' provides a couple of forces created at the opposite ends of each lever 5, 15, 25, but becomes a predetermined axial component of force which keeps a balance between the coupling members 1 and 1'. However, such force never offers a problem in practice because the angle of inclination of the pins 102, 112, 122 and 102', 112', 122' is small.

Figure 9:
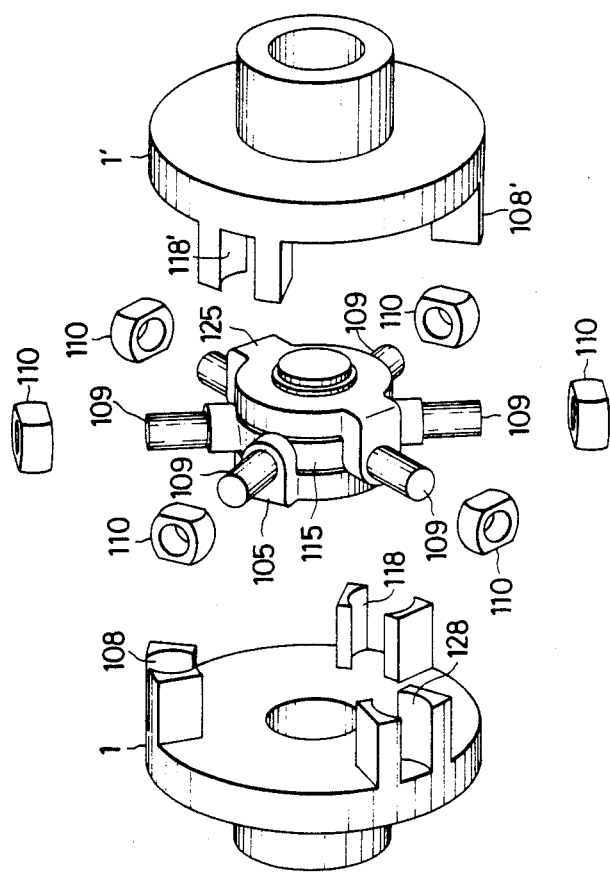
FIG. 9 is an exploded perspective view showing the construction of a sixth embodiment of the present invention.

FIG. 9 is an exploded perspective view showing the construction of a sixth embodiment of the present invention. In FIG. 9, coupling members 1 and 1' are provided with axial cylindrical grooves 108, 118, 128 and 108', 118', 128' in the inner surfaces thereof, levers 105, 115 and 125 are provided with radially extending pins 109, and partially barrel-shaped pieces 110 are loosely fitted in the grooves 108, 118, 128 and 108', 118', 128'.

Such a construction may also lead to an effect substantially equivalent to that of the FIG. 6 embodiment, and can cope with a relatively large amount of eccentricity in arrangement and also can be manufactured inexpensively. In order that an effect similar to that of the embodiment shown in FIG. 8 may be obtained again in the construction as shown in FIG. 9, the grooves 108, 118, 128 and 108', 118', 128' may be provided circumferentially at a predetermined angle with respect to the inner surfaces of the coupling members 1 and 1'.

I claim:

1. A coupling between a first rotary shaft and a second rotary shaft, said coupling comprising a first plate coaxial with and rigid with said first shaft, a second plate coaxial with and rigid with said second shaft, a floating intermediate device comprising at least three levers and a center articulation pivotally assembling said levers, first means for connecting an end portion of each lever to said first plate, the first means including first torque transmitting elements disposed between the end portion of each lever and the first plate, means for holding said first elements on said first plate each slidably along a first axis in a direction forming a certain angle with said first plate and rotatably about said first axis, means for holding each first element on said end portion of said lever slidably along and rotatably about a second axis that extends lengthwise of the lever, said holding means comprising a first pair of spaced cylindrical surfaces on each first element and a second pair of spaced cylindrical surfaces on an assocaiated lever end portion, with both pairs of cylindrical surfaces being generated about said second axis and with the surfaces of the first pair fully contiguous with the respective surfaces of the second pair, second means for connecting an opposite end portion of each lever to said second plate, the second means including second torque transmitting elements disposed between the opposite end portion of each lever and said second plate, means for holding said second elements on the opposite end portion of the lever slidably in the lengthwise direction thereof, and means for holding said second elements on said second plate each slidably along and axis in a direction forming a certain angle with said second plate and rotatably about said last-mentioned axis.

2. A coupling according to claim 1, wherein each of said second elements is rotatable about an axis extending in said lengthwise direction of an associated lever, and wherein the means for holding the second elements on the opposite end portion of the lever comprises spaced cylindrical surfaces on each second element and spaced cylindrical surfaces on an opposite lever end portion that are fully contiguous with the respective cylindrical surfaces of the second element and that have a common axis therewith in said lenghtwise direction.

3. A coupling according to claim 1, wherein said first axis is perpendicular to said first plate.

4. A coupling according to claim 1, wherein said last-mentioned axis is perpendicular to said second plate.

* * * * *